US007965733B2

(12) United States Patent
Chan et al.

(10) Patent No.: US 7,965,733 B2
(45) Date of Patent: *Jun. 21, 2011

(54) SYSTEMS AND METHODS TO DETECT AND AVOID COLLISIONS IN CHANNEL SENSE MULTIPLE ACCESS COMMUNICATIONS WITH MULTIPACKET RECEPTION

(75) Inventors: Douglas S. Chan, Ithaca, NY (US); Toby Berger, Ithaca, NY (US)

(73) Assignee: Cornell University, Ithaca, NY (US)

( * ) Notice: Subject to any disclaimer, the term of this patent is extended or adjusted under 35 U.S.C. 154(b) by 244 days.

This patent is subject to a terminal disclaimer.

(21) Appl. No.: 11/375,853

(22) Filed: Mar. 14, 2006

(65) Prior Publication Data

US 2006/0245448 A1    Nov. 2, 2006

Related U.S. Application Data

(60) Provisional application No. 60/594,143, filed on Mar. 15, 2005.

(51) Int. Cl.
*H04L 12/413* (2006.01)
*H04J 3/02* (2006.01)

(52) U.S. Cl. .................. 370/445; 370/448; 370/462

(58) Field of Classification Search .................. 370/229, 370/230, 235, 236, 236.1, 236.2, 431, 445, 370/447, 448, 458, 461, 462; 398/98, 99
See application file for complete search history.

(56) References Cited

U.S. PATENT DOCUMENTS

| 4,063,220 | A | 12/1977 | Metcalfe et al. | 340/147 |
|---|---|---|---|---|
| 4,412,326 | A | 10/1983 | Limb | 370/85 |
| 4,663,757 | A * | 5/1987 | Huang et al. | 370/447 |
| 4,949,336 | A | 8/1990 | Hamada et al. | 370/85.2 |
| 5,485,147 | A | 1/1996 | Jaffe et al. | 340/825.5 |
| 5,719,899 | A | 2/1998 | Thielecke et al. | 375/206 |
| 5,917,629 | A | 6/1999 | Hortensius et al. | 359/136 |
| 6,157,616 | A | 12/2000 | Whitehead | 370/252 |
| 6,181,683 | B1 | 1/2001 | Chevillat et al. | 370/329 |
| 6,493,335 | B1 * | 12/2002 | Darcie et al. | 370/344 |
| 6,539,028 | B1 * | 3/2003 | Soh et al. | 370/445 |
| 6,859,464 | B2 * | 2/2005 | Abi-Nassif et al. | 370/447 |
| 2001/0033579 | A1 * | 10/2001 | Nelson et al. | 370/447 |

OTHER PUBLICATIONS

Qing Zhao, Lang Ton, "A Dynamic Queue Protocol for Multiaccess Wireless Networks with Multipacket Reception", Nov. 2004, IEEE Transactions on Wireless Communications, vol. 3, No. 6.*

(Continued)

*Primary Examiner* — Seema S Rao
*Assistant Examiner* — Christine Duong
(74) *Attorney, Agent, or Firm* — Burns & Levinson LLP; Orlando Lopez

(57) ABSTRACT

Methods and systems to perform collision detection (CD) in a communication network are disclosed. Methods and systems over multipacket reception (MPR)-capable physical layers are also disclosed. In one embodiment, the method for transmitting information in a network includes the steps of initiating transmission over a communication channel, monitoring a feedback channel, modifying transmission parameters for the transmission over the communication channel (where modifying includes stopping transmission and adjusting transmission parameters), if a feedback transmission is detected while monitoring the feedback channel, a duration of the feedback transmission being smaller than duration of the transmission over the communication channel, and determining whether transmission was successful, if transmission continues after modifying transmission parameters. Other embodiments of methods for transmitting and receiving information, as well as systems that implement the methods, are also disclosed.

48 Claims, 10 Drawing Sheets

Flowchart for terminals performing transmissions.

OTHER PUBLICATIONS

Ghez, S. et al. Optimal Decentralized Control in the Random Access Multipacket Channel. IEEE Trans. Auto. Contr. 34(11) Nov. 1989, 1153-1163.

Chan, D.S. et al. On the Stability and Optimal Decentralized Throughout of CSMA with Multipacket Reception Capability. Proc. Of Allerton Conference on Comm. Control and Computing, 2004, 1-10.

Chan, D.S. et al. Energy Efficiency of CSMA Protocols for Wireless Packet Switched Networks. IEEE Comm. Soc. 2004, 447-452.

Chan, D.S. et al. Performance and Cross-Layer Design of CSMA for Wireless Networks with Multipacket Reception. Proc. Of Asilomar Conf. on Signals, Systems and Computers, 2004, 1917-1921.

Tong, L. et al. Multipacket Reception in Random Access Wireless Networks: From Signal Processing to Optimal Medium Access Control. IEEE Comm. Mag., Nov. 2001, 108-112.

Kleinrock, L. et al. Packet Switching in Radio Channels: Part I—Carrier Sense Multiple-Access Modes and Their Througput-Delay Characteristics. IEEE Trans. on Comm. 23(12), Dec. 1975, 1400-1416.

Kobayashi, T. et al. Slotted Nonpersistent CSMA with an Adaptive Array and Canceling Signal. Global Tel. Conf., Nov. 18-22, 1996. From "Communications: the Key to Global Prosperity," vol. 1, 565-569.

Tobagi, F.A. Analysis of a Two-Hop Centralized Packet Radio Network—Part I: Slotted ALOHA. IEEE Trans. Comm. COM-28(2) Feb. 1980, 196-207.

Chiu, Y. et al. OFDM Receiver Design. UC Berkeley, EE225/C/Lectures/EE225C_2000project, 2000.

Gummalla, A.C.V. et al. Design of an Access Mechanism for a High Speed Distributed Wireless LAN. IEEE J. Areas Comm. 18(9), Sep. 2000, 1740-1750.

* cited by examiner

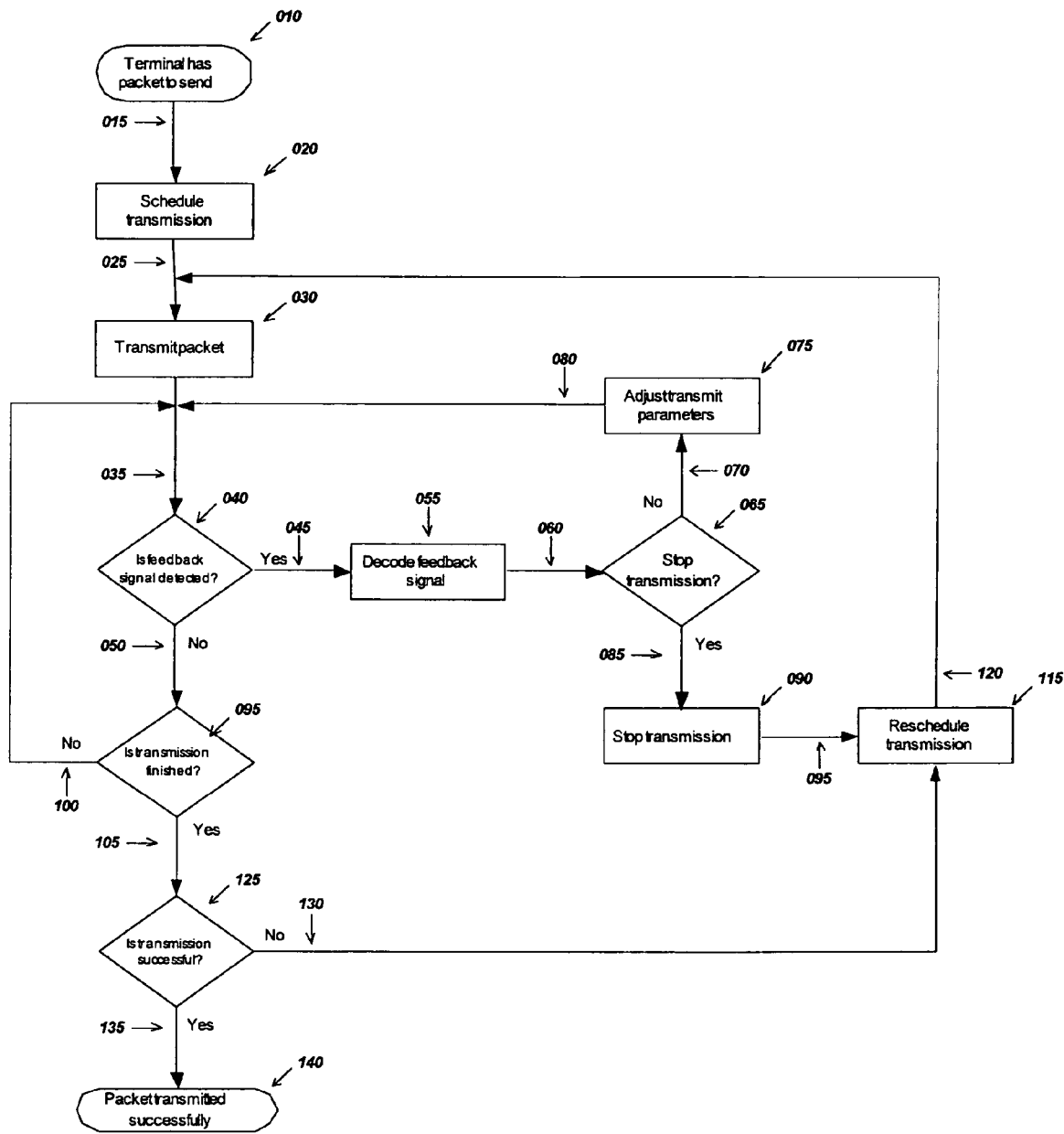
Figure 1: Flowchart for terminals performing transmissions.

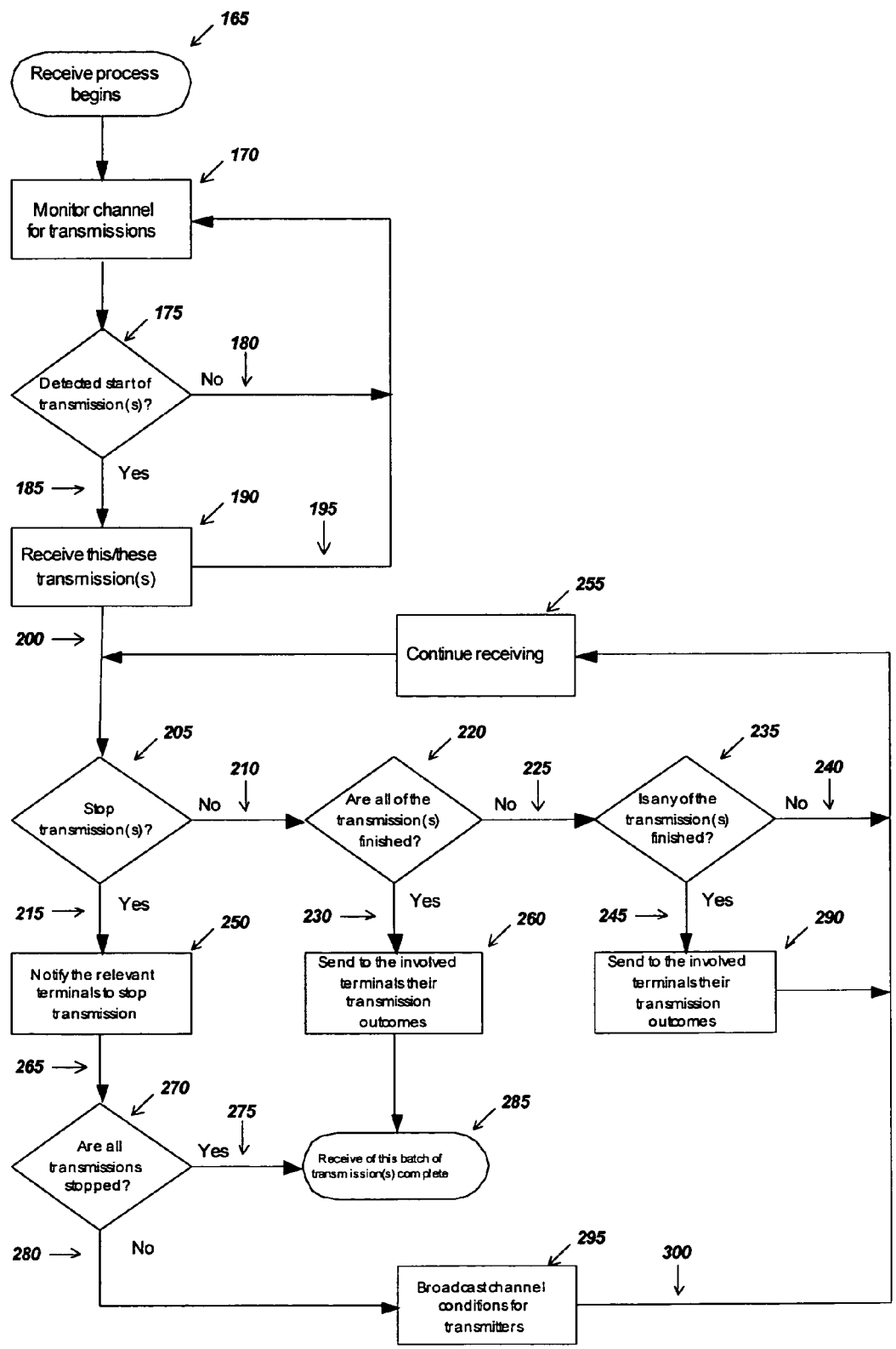
Figure 2: Flowchart for receivers or central controllers with non-busy-tone collision detection

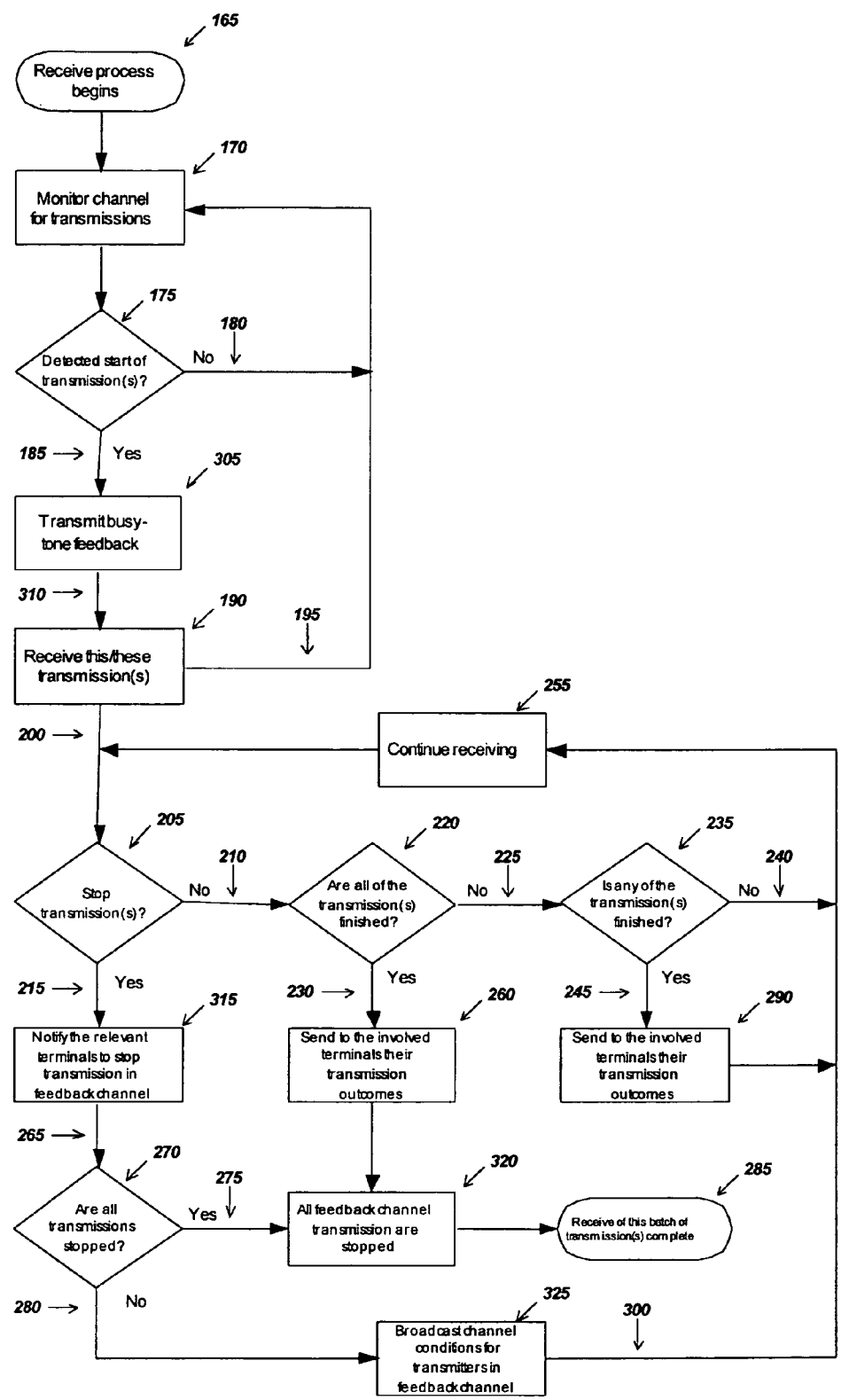
Figure 3: Flowchart for receivers or central controllers with busy-tone collision detection

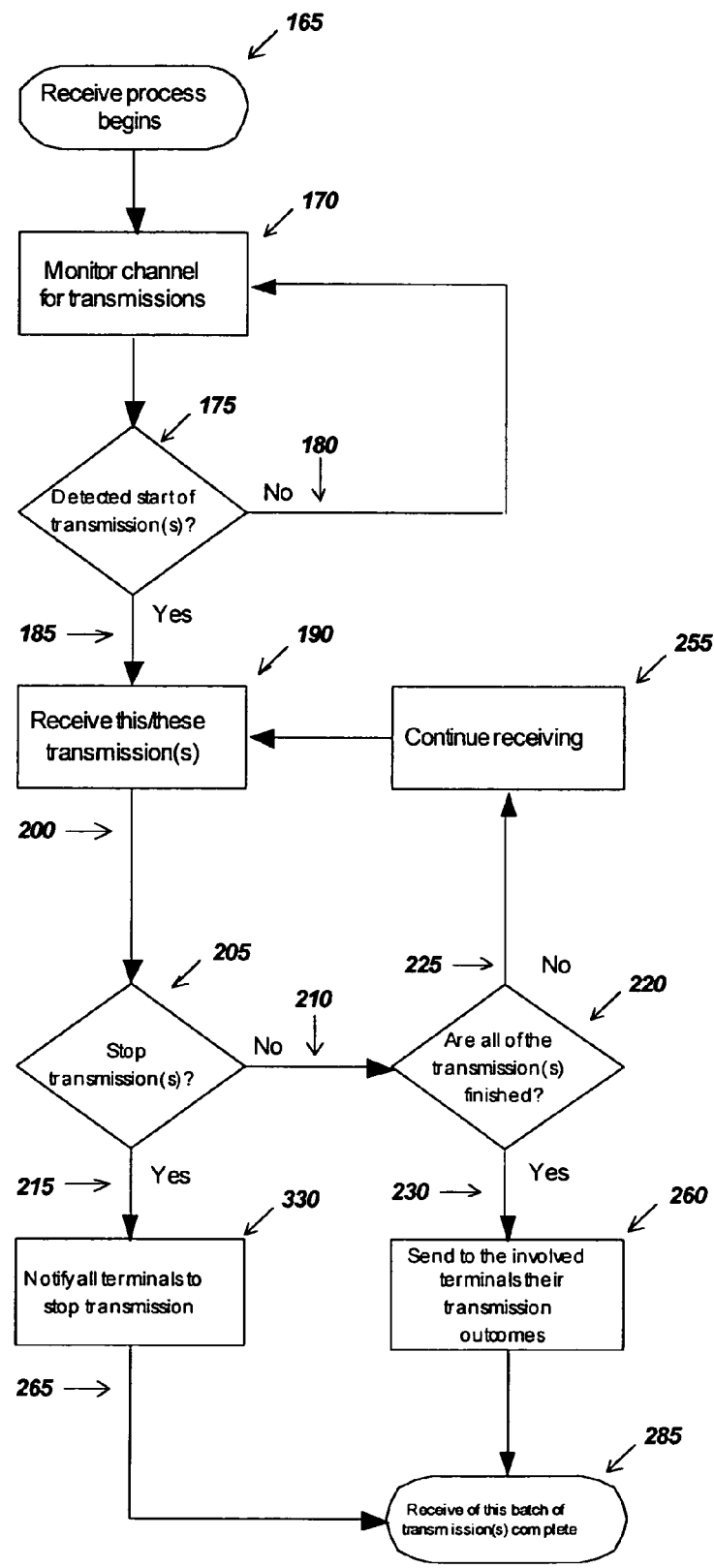
Figure 4: Flowchart for a receiver in a non-busy-tone non-MPR capable CSMA/CD preferred embodiment

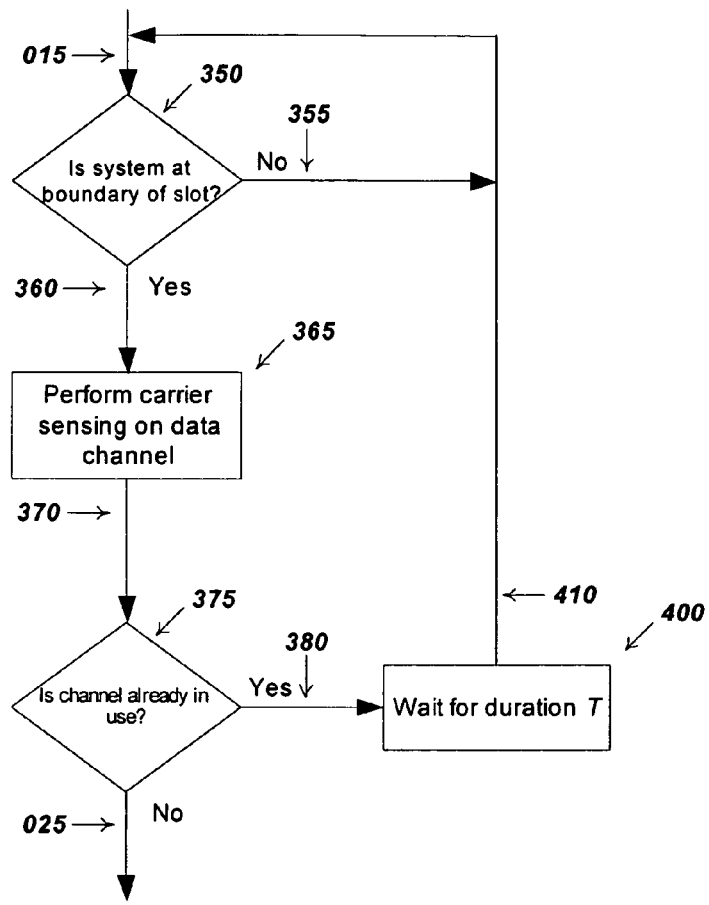
Figure 5: Flowchart for scheduling transmissions for a non-busy-tone non-MPR capable CSMA/CD preferred embodiment
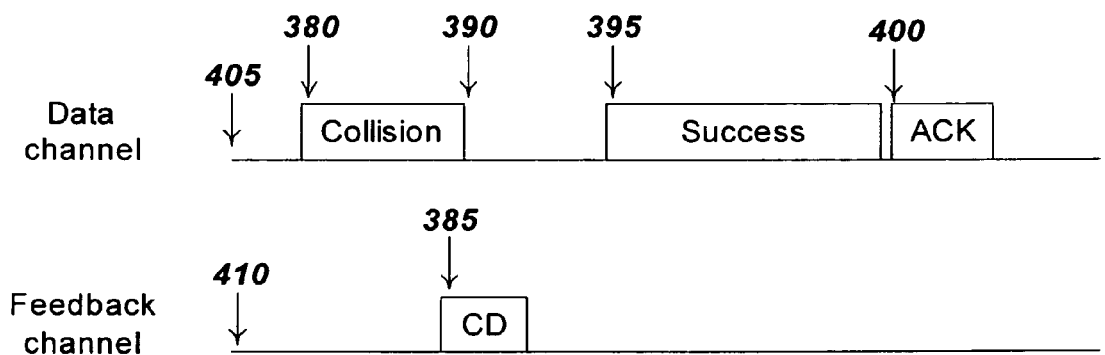
Figure 6: Example of a timing diagram for a non-busy-tone non-MPR capable CSMA/CD preferred embodiment

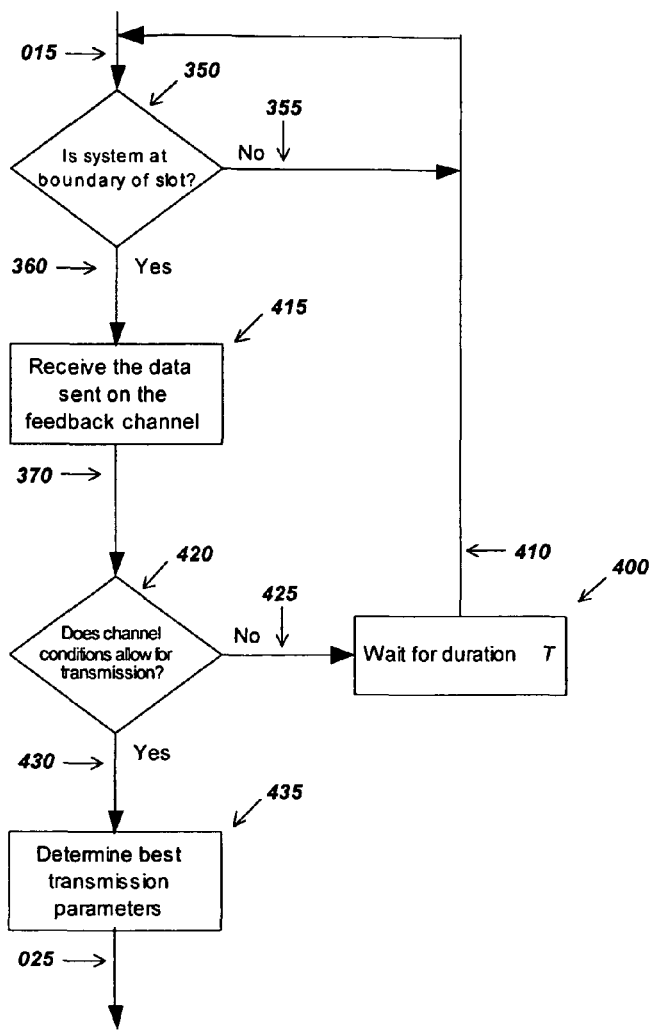
Figure 7: Transmit process of a busy-tone CSMA/CD preferred embodiment for a general MPR capable PHY layer.
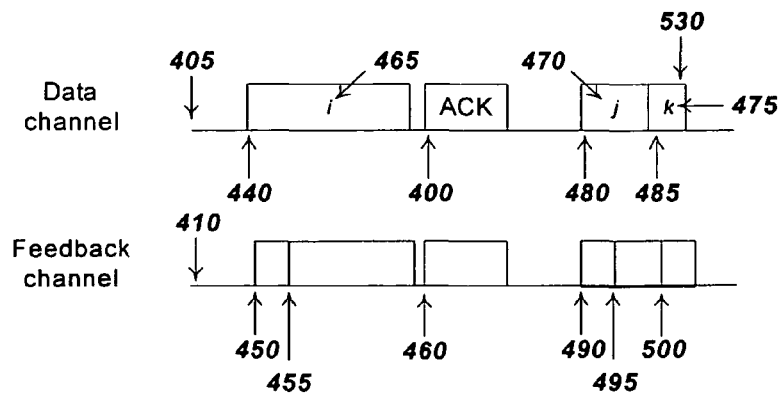
Figure 8: Example of a timing diagram for a busy-tone MPR capable CSMA/CD preferred embodiment

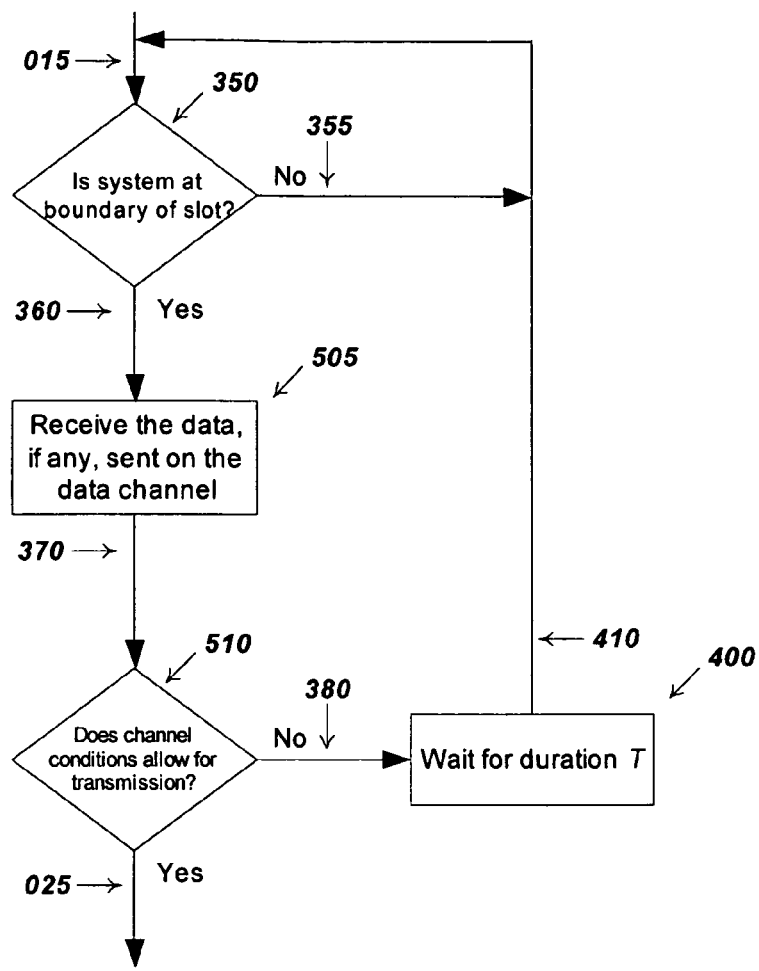
Figure 9: Transmit process of a non-busy-tone CSMA/CD preferred embodiment for a MPR capable PHY layer.
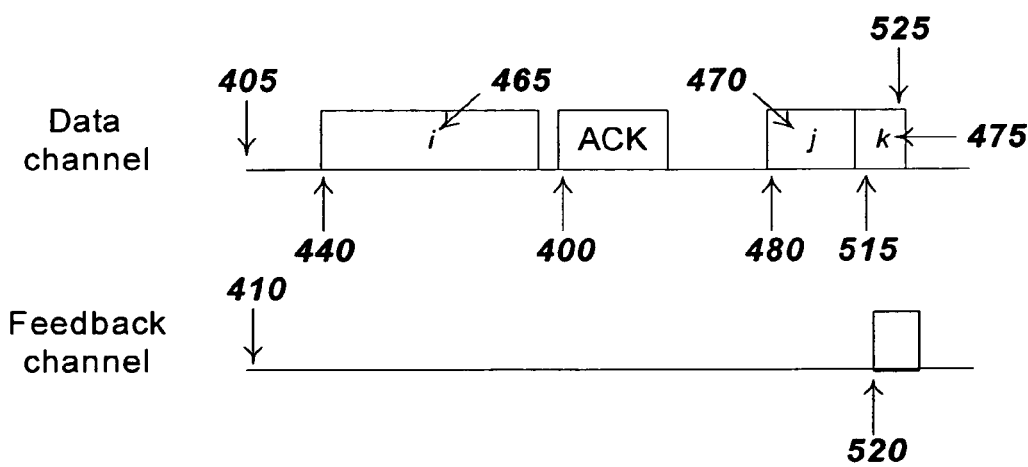
Figure 10: Example of a timing diagram for a non-busy-tone MPR capable CSMA/CD preferred embodiment

SYSTEMS AND METHODS TO DETECT AND AVOID COLLISIONS IN CHANNEL SENSE MULTIPLE ACCESS COMMUNICATIONS WITH MULTIPACKET RECEPTION

CROSS-REFERENCE TO RELATED APPLICATIONS

This application claims priority to U.S. Provisional Patent Application No. 60/594,143, Methods to Exploit Carrier Sensing and Collision Detection in Multiple Access Communications with MultiPacket Reception, filed Mar. 15, 2005 by D. S. Chan and T. Berger, the content of which is hereby incorporated by reference.

STATEMENT REGARDING FEDERALLY SPONSORED RESEARCH OR DEVELOPMENT

This invention was made partially with U.S. Government support from the National Science Foundation, Contract No. CCR-0330059. The U.S. Government has certain rights in the invention.

BACKGROUND OF THE INVENTION

Carrier sense multiple access (CSMA) communications is a method which employs the terminal's channel-sensing capability to schedule transmissions. Each terminal can only attempt transmission when no others are using the medium. The terminals can determine this condition by sensing whether there is signal energy at the frequency bands designated by the system for transmission. A terminal will reschedule their attempts for a, possibly random, later time when this happens or when its transmission is not successful.

An enhancement to CSMA is CSMA with collision detection (CSMA/CD), for which a transmitting terminal also continually senses the carrier and will stop transmission if any other simultaneous transmissions are detected. As most networks' physical (PHY) layers commonly employ signaling schemes that do not facilitate more than one transmissions at a time, i.e., that a transmission occurring in the presence of any others will result into a collision of their signals and none of them will be received correctly, collision detection can shorten the amount of time the channel is occupied with collisions to the least possible. Subsequently, significant improvement in throughput and delay is achieved. Since the signaling schemes of these PHY layers involve a carrier, CSMA is in fact performed by sensing the presence of this carrier; and thus CSMA is also known as carrier sense multiple access in those contexts.

CSMA/CD has since become the protocol for scheduling packet transmissions in the medium access control (MAC) layer of IEEE 802.3, the de facto standard for wired local area networks (LANs), or what is popularly known as Ethernet. In these systems, the channel is the common wire medium—usually a coaxial cable or in recent years perhaps a fiber optic line—connecting each station in the network. By sensing the signal level on the wire, stations become aware of when another station already has started transmission.

CSMA was also chosen as the MAC layers' access methods of the currently widely adopted IEEE 802.11 wireless LAN (WLAN) standards (IEEE 802.11, 802.11a, 802.11b, 802.11g). Nevertheless, collision detection is not considered because it is commonly agreed upon that this can not be easily implemented in the wireless environment. Different from wired mediums, during transmission a wireless terminal's antenna radiates a significant amount of energy which saturates its radio frequency (RF) front-end. And as a result, during this time the terminal can only receive its own RF signal and cannot detect any transmissions from others that are at the transmission's frequency. Such a phenomenon is commonly known as self-interference and is the reason duplex RF communications cannot occur at the same frequency.

Duplex RF communications can in fact be performed if the wireless terminal transmit and receive at different frequencies. For example, the terminal can either employ two antennae for each of these tasks or one antenna with a circulator. The circulator, also known as the duplexer, is a device that allows the RF transmitter and receiver circuitries to share an antenna by passing through the relevant signal to each of them as required. In either case, these channels need to be sufficiently separated so that a band pass filter can attenuate the transmitted signal enough for proper decoding of the received signal.

With the structure for duplex RF communications defined, CD in a wireless environment can be performed by delegating the detection to the receiving terminal. The system will have two channels, one for data transmission and one for transmitting a feedback signal for indicating a collision has occurred. When the receiving terminal detects there is more than one transmission on the data channel, it will indicate this on the feedback channel. A transmitting terminal can find out if there is a collision by listening to the feedback channel during the transmission.

The first receiver-initiated CD method was proposed in 1988 by Wu and Li. In their scheme, called the receiver-initiated busy tone multiple access (RI-BTMA), the system's bandwidth is divided into two channels, one for data transmission and one for the busy tone. When there is transmission detected on the data channel, the receiver will attempt to decode the preamble of the transmission. If this is successful, as usually is when only one terminal transmits, then the receiver will assert the busy-tone signal until the transmission is over. And so instead of carrier-sensing the data channel for radio frequency activities, in the RI-BTMA scheme terminals monitor the busy-tone channel to determine when others have already started transmissions. And for a terminal that is already transmitting, it can find out if it has become involved in a collision by monitoring whether the receiver has initiated the busy-tone channel.

With the terminals performing carrier sensing on the busy-tone channel rather than the data channel, the protocol also solves another problem common in wireless networks: the hidden terminal problem. Namely, this problem addresses the possibility that a wireless terminal can be within transmission range from a receiver but out of range from some other ("hidden") terminals such that their transmissions are not detected. If there are on-going transmissions from these "hidden" terminals and if it decides to transmit, then collisions will ensue. Since the receiver should be within range of the terminals that are interested in communicating to it, its busy-tone can be heard by these terminals and so the hidden terminal problem is eliminated.

Wu and Li's RI-BTMA actually only partially solves the hidden terminal problem since the receiver does not begin to issue any busy tone until it successfully has decoded the preamble. During the time needed for the receiver to perform this task, the system is vulnerable to incorrect carrier sensing as terminals may detect no busy-tone and wrongly think that no others are currently transmitting. Therefore, if the receiver can assert a busy-tone as soon as it detects any potential data transmission, as in the original non-receiver-initiated BTMA scheme introduced by Tobagi and Kleinrock, then this vulnerable period would no longer exist.

Such enhancement to the RI-BTMA is precisely what Gummalla and Limb suggested in their 2000 paper. In their scheme, named the Wireless Collision Detect (WCD), the busy-tone channel is called the "feedback" channel and the receiver will assert the "carrier detect" signal on it when there is any signal energy detected on the data channel. If the receiver successfully decodes the preamble of this transmission and that this transmission is destined for it, then it will begin asserting instead on the feedback channel the "feedback" signal. If the preamble is not decoded successfully, as will be if there is more than one concurrent transmissions, i.e., a collision has occurred, then the receiver will stop asserting the feedback signal. And similar to RI-BTMA, based on whether this signal is there, the transmitting terminal would know it is involved in a collision, and if so it will terminate its transmission.

The hidden terminal problem actually may not be of concern for some wireless networks. For example, there are networks where terminals are close to each other, like in a wireless personal area network (WPAN). In these cases, just monitoring the data channel for carrier signal energy would be dependable and suffice to perform CSMA. There will also be no need for a busy-tone or a carrier-detect signal that lasts for the transmission's duration. A receiver-initiated feedback or CD signal would still be needed to perform CSMA/CD, though now this signal can be very short, lasting long enough for the transmitting terminals to detect it.

SUMMARY OF THE INVENTION

In one embodiment, the method for transmitting information in a network includes the steps of initiating transmission over a communication channel, monitoring a feedback channel, modifying transmission parameters for the transmission over the communication channel (where modifying includes stopping transmission and adjusting transmission parameters), if a feedback transmission is detected while monitoring the feedback channel, a duration of the feedback transmission being smaller than duration of the transmission over the communication channel, and determining whether transmission was successful, if transmission continues after modifying transmission parameters.

Other embodiments of methods for transmitting and receiving information, as well as systems that implement the methods, are also disclosed.

For a better understanding of the present invention, together with other and further needs thereof, reference is made to the accompanying drawings and detailed description and its scope will be pointed out in the appended claims.

BRIEF DESCRIPTION OF THE DRAWINGS

FIG. 1 is a schematic flowchart representation of an embodiment of the method of this invention for transmitting information;

FIGS. 2, 3, 4 are schematic flowchart representations of embodiments of the method of this invention for receiving information;

FIG. 5 is a schematic flowchart representation of a section of another embodiment of the method of this invention for transmitting information;

FIG. 6 is a schematic graphical representation of a timing diagram for the embodiment of FIG. 5;

FIG. 7 is a schematic flowchart representation of a section of yet another embodiment of the method of this invention for transmitting information;

FIG. 8 is a schematic graphical representation of a timing diagram for the embodiment of FIG. 7;

FIG. 9 is a schematic flowchart representation of a section of a further embodiment of the method of this invention for transmitting information;

FIG. 10 is a schematic graphical representation of a timing diagram for the embodiment of FIG. 8;

DETAILED DESCRIPTION OF THE INVENTION

Figure 11:
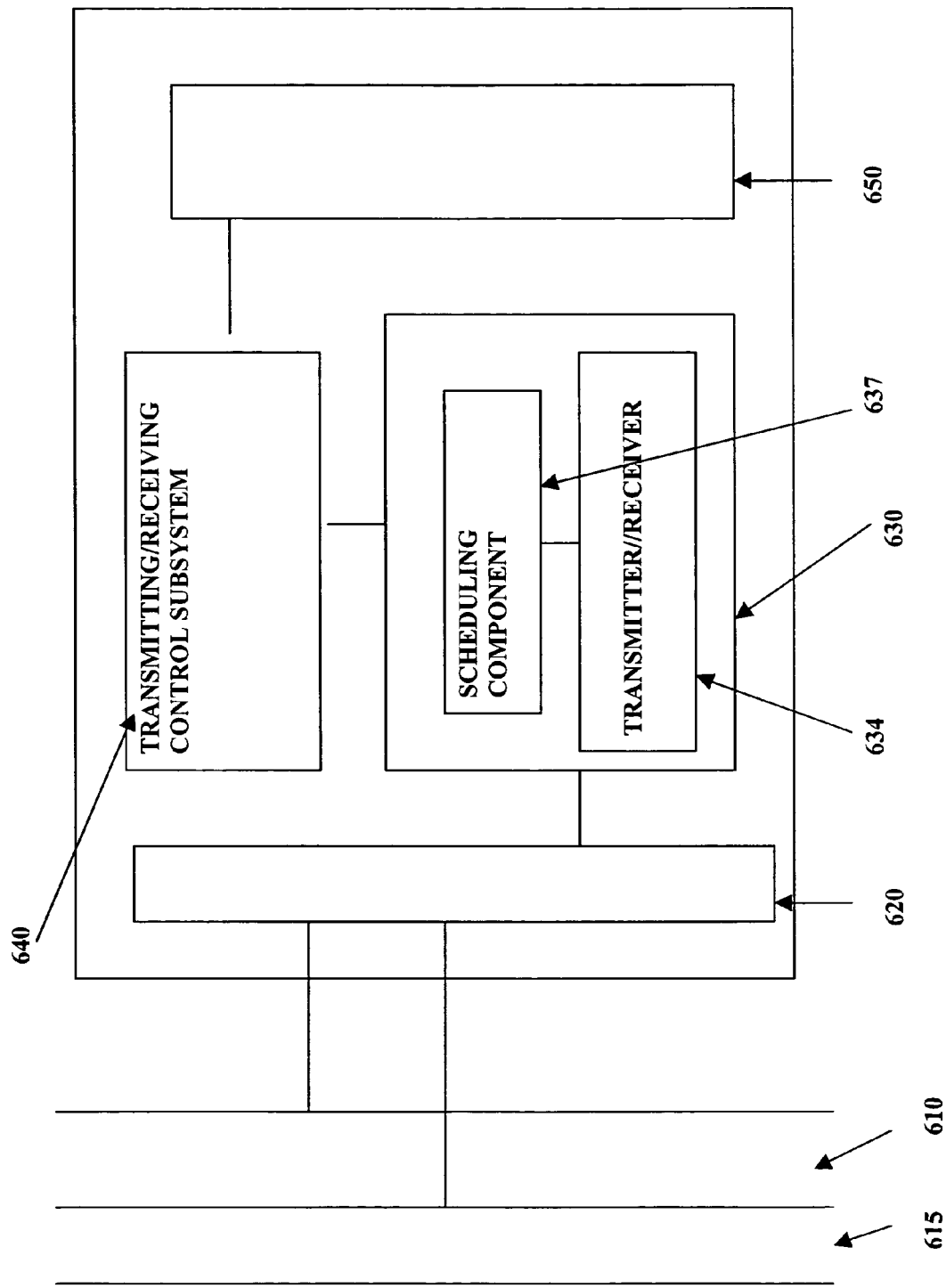
FIG. 11 is a schematic block diagram representation of an embodiment of the transmitting system of this invention.

In an embodiment of the method of this invention, the transmitters systems detect carrier signal energy on the data channel to determine if there are any others using the channel. When the receiver detects a collision, it will broadcast a CD signal on the feedback channel lasting only for the duration which the participating transmitters would require to detect it. Each transmitting terminal will monitor the feedback channel for the CD signal and stop transmitting if it is present. (Channel sensing, as used herein, can include carrier sensing.)

Although the method of this invention does not explicitly address the hidden terminal problem, with the help of CD, the degradedness in performance will not be as significant as without. Moreover, the method of this invention helps conserve energy from the receiver not having to transmit when the channel is active. This can be important if the receiver is a terminal in an ad hoc network, where each terminal has finite battery life.

The present invention can also be extended over PHY layers with multipacket reception (MPR) capability (as described in co-pending application Ser. No. 11/376,067, which is incorporated by reference herein; see also, D. S. Chan, T. Berger and L. Tong, "On the Stability and Optimal Decentralized Throughput of CSMA with Multipacket Reception Capability," Proc. of Allerton Conference on Comm., Control, and Computing, 2004 and D. S. Chan and T. Berger, "Performance and Cross-Layer Design of CSMA for Wireless Networks with Multipacket Reception Capability," Proc. of Asilomar Conference on Signals, Systems and Computers, 2004, both of which are incorporated by reference herein). In recent years there have been many new developments in signal processing, coding and spread spectrum techniques that facilitate receivers' ability to separate and correctly decode multiple packets transmitted simultaneously over a wireless channel; this is known as MPR. By applying knowledge of the PHY layer's MPR properties in the MAC layer's design, the overall system's performance can improve greatly or even reach the optimum. This idea is known as cross-layer design for wireless networks with MPR. Furthermore, the MPR model can also incorporate characteristics of the channel, like fading or noise. As a result, from modeling a PHY layer with an MPR model, the resulting cross-layered system should have better performance.

Embodiments of systems of this invention can be wired or wireless in nature, although the invention circumvents properties found in wireless channels that can prevent CD from implemented. The access mode employed also is not limited to only carrier sensing methods as long as the method to detect collisions in the invention can still be applied. The term "collision" is not limited to situations when a transmission becomes corrupted due to more than one other simultaneous transmission; in this invention disclosure the term embodies the more general meaning of any failing transmission or those that are likely to. Two embodiments of CD methods of this invention include: one that involves broadcasting a busy-tone for MPR-capable only channels and one that does not use busy-tone for all types of channels.

As previously discussed, the MPR capability refers to any transmission method that allows a receiver to be able to separate and decode the signals sent simultaneously by multiple transmitters. The decoding can be error-free or with a feasibly low level of error, and it can be combated with forward error correction coding. Methods for achieving MPR capability include: (i) space-time coding, (ii) multiple input multiple output signaling, (iii) spread spectrum modulation, (iv) frequency hopping, (v) multiple access coding, and (vi) combinations thereof.

Due to the time needed for signal propagation in the communications medium, changes in the channel's transmission properties may not be reflected at a terminal's location instantaneously. However, such signal changes always will have arrived at every station after the system's maximum signal propagation delay, which equals the speed of signal propagation multiplied by the maximum separation distance between any two terminals in the system at least one of which can transmit.

The manner in which the terminals conduct their transmissions can be either asynchronous or synchronous. For the latter case, time is partitioned into slots and terminals can initiate transmissions at each slot's boundary; this is called a slotted-time system. If the slot duration is chosen to be at least the maximum propagation delay, then channel activities initiated at the beginning of each slot are reflected at all the terminals by the start of the next slot. Detection and estimation techniques that are appropriate to whether the transmission method is asynchronous or is synchronous must be employed at the receiver.

FIG. 1 provides the transmitter's operations for the invention. Whenever the terminal has a packet to send 010, the terminal will schedule its transmission according to the algorithm prescribed by the system 020. After the packet has been transmitted 030, the terminal will monitor the feedback channel for any CD transmission 040. If the CD transmission is detected 045, the terminal will decode it 055. If the CD transmission indicates that the terminal should stop its transmission 085, then the terminal will do so 090 and then reschedule the transmission according to the algorithm prescribed by the system 115. In the general case, the feedback channel can also be used to provide information about the data channel or the transmitter's transmission. If this is implemented, then the transmitting terminal can use this information to adjust its transmit parameters 075; if not, the flow of operation is equivalent to removing adjust module 075 and lead 080 and connecting lead 070 directly to lead 035. In other words, if the CD signal does not require the transmitting terminal to stop 070, then it continues with the transmission but at the same time resumes monitoring of the feedback channel. The terminal continues this monitoring if the transmission is not complete 100. If it is finished 105, the terminal will determine whether it is successful. If it is not 130, then a retransmission is rescheduled 115; this rescheduling may use a different algorithm from the one used when transmission is stopped by the CD. If the transmission is successful, then the transmission process is deemed completed 140.

The flowchart for the receiver's operations for the non-busy-tone version of our CD method is given in FIG. 2. After the receive process begins 165, the receiver will start monitoring the channel for transmissions 170 and decide whether one or more transmissions have begun 175. This can be achieved, for instance, by detecting an increase of signal energy in the channel. If no transmissions are detected yet 180, the receiver will continue to monitor the channel for them. If it is detected that one or more transmissions is starting 185, then the receiver will begin to receive these transmissions 190. The exact mechanism for receiving transmissions will depend on the MPR technique employed in the system's PHY layer and is accomplished via an appropriate receiver structure. The receiver will also return to monitor the channel for subsequent transmissions 195. Because of the paths 180 and 195 that feeds back to channel monitor 170, the receiver is constantly monitoring the channel for transmissions. Therefore, if a subsequent transmission is detected, receive procedures concurrent to the existing ones will be started for these later transmissions. In other words, the receive process can be an ongoing one.

During the receiving procedure 190 the receiver will determine whether or not any transmissions should be terminated 205. If the receiver deems that one or more terminals' transmissions would not be decoded properly 215, the receiver will notify these terminals 250 to stop transmitting. The relevant terminals can be all of those involved or a selected number of them of which the receiver deems it would be beneficial to have their transmissions terminated. If only a subset of the transmissions is to be terminated 280, the receiver will continue to receive the rest of the transmissions 255. Since any subsequently started transmissions can occupy the channel simultaneously with the existing ones, the receiver may also notify these newly transmitting terminals to stop as well. The frequency band at which this notification is sent is a different one from the data channel. In systems where transmitters can continue to receive at the frequency that it is transmitting, the notification can be sent on the same channel. The receiver can also employ MPR techniques to communicate this feedback as well.

If all transmissions are stopped 275, the receive process initiated for this batch of transmissions is then complete 285. This is the case for a system with a non-MPR capable PHY layer. But in fact, for a receiver of the cross-layer form with CD, since all transmissions are stopped, all of the receive processes in the receiver will reach completion as well.

Transmittal of successful-receipt acknowledgments can be performed via a mechanism that is appropriate for the system, even taking into account the MPR technique that is employed. For instance, the receiver can send on the channel a jamming signal, upon detection of which all the transmitters will terminate their transmissions.

If the receiver does not wish to stop any transmissions 210, during the receiving procedure the receiver will also continually determine whether or not all of the transmissions have finished yet 220; this concerns only the batch of transmissions which were detected to have started at the same time in detect transmissions module 175 and for which the receive procedure 190 was started. If they are all finished 230, and if the receiver is responsible for providing feedback to the terminals, then the receiver will send acknowledgements 260 to the involved terminals informing them of their transmissions' outcomes. However, if there are still transmissions unfinished 225, as with the case of packets that are not of a uniform length, the receiver will determine if any of the transmissions from this batch have completed 235. If none of them are finished yet 240, the receiver continues receiving these transmissions 255. But if some of them are already finished 245, and if the receiver is responsible for providing feedback to the terminals, then the receiver will send acknowledgements to the involved terminals 290. After this, the receiver continues to receive the rest of these transmissions 255. The manner in which the receiver sends the acknowledgements can be the same way as any of those by which the transmission-termination packets are transmitted, as described above.

The flowchart of FIG. 4 describes not only the receivers of the system infrastructure (i.e., the receiving circuitry within what is commonly called the system's access points), but also describes the receive processes implemented in the terminals of systems in which terminals are required to both transmit and receive data packets. Moreover, if the system has a central controller that only monitors the channel for collision detection, the flowchart of FIG. 4 also can be this controller's receive process. In those cases in which a central CD controller does not need to provide acknowledgements, the flowchart for its receive process will be equivalent to removing acknowledgement modules 260 and 290, and connecting lead 230 to reception complete module 285 and lead 245 to continue reception module 255. On the other hand, if the system does not implement CD, then the equivalent flowchart for each of this system's receivers can be obtained by removing leads 210, 215, 265, and 280, terminate transmission decision modules 205 and 270, and notification module 250, and connecting lead 200 directly to decision module 220.

The system is not limited to just one central controller monitoring the channel; if there are more, any one of them can select to terminate the appropriate transmissions if doing so would benefit the performance of the system. Similarly, a system may also consist of multiple receivers; for instance, each terminal in the system may wish to receive transmissions from other terminals. If multiple receivers are present in the system, and if they are also responsible for monitoring the channel for collision detection, this can be performed as in said case with multiple CD controllers. Furthermore, a terminal may consider that its transmission has been successful 065 only if it has been received by every one, or by every relevant one of these receivers.

Because this receiver process is for a non-busy-tone system, duration of the notification to stop transmission 250 will last only the amount of time required for the transmitter to detect and decode it. The length of this duration is system dependent.

In the general case, the feedback channel can also be used to provide information about the data channel or the transmitter's transmission. In the non-busy-tone version of the method, this data can be sent in various ways: 1) Piggybacked with the CD feedback when CD is detected 250; 2) Piggybacked with the receipt acknowledgements 260 290; 3) Broadcasted regularly 295; 4) A combination of the above. The duration of these notification packets should also be of a length that is as short as possible, certainly not a continuously broadcasted signal.

For MPR-capable systems employing the embodiment of this invention with busy-tone multiple access method, the receiving process is illustrated in FIG. 3. This process is the same as that in the non-busy-tone method except for the broadcasting of the busy-tone. When the receiver detects any transmissions 185, it will transmit in the feedback channel a signal indicating that the channel is currently being used 305. The receiver can also use this signal to communicate the status of the data channel, for example, the number of terminals currently transmitting. This is updated periodically 325. We will denote this signal in general to be the "busy-tone".

When a collision is detected 215, the receiver will utilize the feedback channel to inform the relevant terminals to terminate transmissions. The manner by which this is performed can involve stopping the busy-tone, so that all the involving transmitters terminate when they detect this. In any case, when all the transmissions are finished or terminated, the feedback channel should be idle 320. The remaining components of this process are identical to that described for the non-busy-tone method in FIG. 2. In MPR-capable systems where transmitters can continue to receive at the frequency that it is transmitting, the busy tone can in fact be sent at this frequency band but via the MPR techniques so that it is detected.

Several embodiments of the invention are now described and illustrated by the accompanying drawings. It is understood that modifications can be made to these embodiments and that cognate embodiments exist that also are contained within the scope and spirit of the present invention. Therefore, the present invention is not limited to the descriptions of these embodiments.

FIGS. 4-6 illustrate a preferred embodiment for a traditional CSMA system that does not have any MPR-capabilities employing the non-busy-tone CD method. FIG. 4 describes the receive process of this system. Such a system cannot accommodate more than one concurrent transmission. If the receiver deems that this is the case, all of the transmissions are terminated 330. The remaining components of this process are identical to that described for the non-busy-tone method in FIG. 2.

Because this system employs the traditional CSMA method to schedule transmission, the transmission process is modified by implementing the process illustrated in FIG. 5 in the schedule transmission module 020 of FIG. 1. If the communications network adapts a slotted-time system, then whenever a terminal wishes to transmit, it will first ascertain whether the timing of the system is at the boundary of a slot 350. If so 360, the terminal will continue with the rest of transmission scheduling process; if not 355, it will initiate this process only at a slot boundary. Obviously these steps are unnecessary if the system is not slotted-time; the associated flowcharts can be obtained via removing the check slot boundary module 350 and leads 355 and 360 and connecting lead 015 directly to the perform carrier sensing module 365. The amount of time that the terminal performs carrier sensing 365 should be long enough so that the terminal can accurately determine whether the channel is already in use 375. If it is 380, then the terminal will wait for a duration of T 400 before repeating the process of carrier sensing again 410. Duration T may be random or computed based on past carrier sensing history. If the channel is not already in use 025, then the schedule transmission process is complete and the terminal begins transmission of its packet.

In FIG. 6, an example of the transmission activities on the two channels for this embodiment is illustrated on a timeline. After the receiver detected that there are more than one terminals transmitting 380 on the data channel 405, it will issue a collision detected signal 385 on the feedback channel 410. After the transmitting terminals detect the CD signal, they will terminate their transmission 390 and reschedule for another time. In the event when there is only one transmission 395 and that it is successfully decoded by the receiver, it will issue an acknowledgment 400 to indicate this result to the terminal.

Several embodiments for a CSMA system that has MPR-capabilities and employs the busy-tone CD method are now considered. The transmit and receive processes of such a system for a general MPR-capable PHY layer are first described; more specific MPR channels are then considered.

The receive process of this general MPR system is already described by FIG. 3. But if this CSMA system does not allow new transmissions to start when the channel is already occupied, then the receive process of such a preferred embodiment can be simplified from FIG. 3 by removing lead 195. The corresponding transmit process is modified by implementing the process illustrated in FIG. 7 in the schedule transmission module 020 of FIG. 1. When the terminal wishes to transmit, it receives the data sent by the receiver on the feedback channel 415, which contains description of the methods used by the current transmissions and the channel's current conditions. With this information, the terminal determines if it is advantageous for its or the overall system's performance to begin transmission 420. If it is not 425, then it will reschedule the transmission after duration T as described above. If it is 430, the terminal will compute the best method, using the information obtained from the feedback channel, to transmit its packet 435; and then transmit it. The rest of FIG. 7 is identical to that of FIG. 5.

A specific version of the MPR-capable busy-tone CD method is now described. Consider a embodiment in which each terminal is assigned a unique spreading code that allows correct decoding of its packet as long as the total number of users transmitting simultaneously is less than or equal to $n^*$, where $1 \leq n^* < M$ and M is the total number of terminals in the system. (In other words, the channel's capacity is $n^*$.) This embodiment represents many spread spectrum systems used in practice in which multiuser detection can perform satisfactorily only when the SIR is below a certain level. The receive process for this MPR channel will be the same as that described above with and not limited to these additional task: 1) In the broadcast channel conditions module 325, the receiver will also send the number of transmission currently using the channel. 2) A condition used in deciding whether to stop transmissions 205 will be whether the current number of transmissions is greater than $n^*$. Similarly, the transmit process for this MPR channel will be the same as that described in FIG. 7 with and not limited to these additional task: 1) In receiving data sent on the feedback channel 415, the terminal will obtain the number of transmissions currently in the channel. 2) In deciding whether the channel conditions allow for transmission 425, a condition used is whether the current number of transmissions is lesser than $n^*$.

An example of the transmission activities on the two channels for this MPR channel is illustrated on a timeline in FIG. 8. In this example, because the feedback channel 410 has been idle, a number of i 465, less than $n^*$, terminals decide to transmit 440. Once the receiver detects the presence of transmissions, it will issue a busy tone 450 and also begin decoding them. Since i is less than $n^*$, there is no need to terminate these transmissions. After the receiver determines this, depending on the system's settings, it broadcasts this number of transmissions on the busy channel 455. If no new terminals decide to join the current batch of transmissions, when these transmissions are finished and that they're decoded successfully, an acknowledgement 400 is issued by the receiver on the data channel 405; a busy-tone is also issued during this time to warn other terminals that the data channel 405 is in use. After this j 470, less than $n^*$, terminals decide to transmit 480. After detecting their presence, the receiver issues a busy tone 490. If this system selects to broadcast the current number of transmissions, then 495, start of these is initiated. Once the receiver detects the presence of transmissions, it will issue a busy tone 490 and also begin decoding them; the number of transmissions is also broadcasted 495. Additional terminals decide to join the transmission 485, bringing the total number of transmissions to k 475. But because k is greater than $n^*$, all the involving transmissions are corrupted now. The receiver realizes this and indicates over the feedback channel that all the transmissions should be terminated 500. Upon detecting this signal, all the involving terminals begin to terminate their transmissions 530.

Another embodiment is a non-busy-tone CSMA/CD system that uses this MPR channel. The transmit process for this is illustrated in FIG. 9. It is a modified version of the non-MPR-capable channel shown in FIG. 5. Namely, rather than just carrier sensing on the data channel 365, the terminal listens to this channel to obtain its current status 505, such as the number of transmissions on the data channel, the codes that they are using and the channel's fading conditions. Based on this information, the terminal decides whether it is advantageous to begin its transmissions 510. The corresponding receive process is the same as that described by FIG. 2, with the condition to stop transmissions 205 to be whether the current number of transmissions is greater than $n^*$.

FIG. 10 provides an example of the activities on each of the channel. Unlike the busy-tone version of this preferred embodiment, because i is less than $n^*$, the receiver does not need to terminate the first batch of these i transmissions 440; thus, no CD signal is issued in the feedback channel. This is also the case with the second transmission batch of j, less than $n^*$, terminals 480. However, during their transmissions, some of the remaining terminals determined (from monitoring the data channel) that they should join the transmission as well 515. But in doing so they also bring the total number of transmissions to be greater than $n^*$. Accordingly, the receiver issues a CD signal 520 in the feedback channel, upon detecting which all the involving transmitters terminate their transmissions 525.

An embodiment of the transmitting system of this invention is shown in FIG. 11. Referring to FIG. 11, the embodiment of the transmitting system of this invention shown therein includes a receiving/transmitting subsystem 630 which is capable of accessing the communication channel 610 and the feedback channel 615 through a physical layer 620 and a transmitter/receiver control subsystem 640 capable of modifying transmission parameters for the transmission over the communication channel 610 and of determining whether information was successfully transmitted, A module 650 generates and processes network data packets that are transmitted by the transmitting/receiving subsystem 640 on the control of the control subsystem 630. The receiving/transmitting subsystem 630 includes a transmitter/receiver portion 634 capable of transmitting information over the communication channel 610 and of receiving information transmitted over the feedback channel 615 and a scheduling component 637 capable of scheduling transmission of information over the communication channel 610. The transmitter/receiver portion 634 can be, in one embodiment, but are not limited to, similar to subsystems use in CSMA without MPR (see, for example, U.S. Pat. Nos. 6,157,616, and 6,181,683, both of which are incorporated by reference herein, and L. Kleinrock and F. Tobagi, "Packet Switching in Radio Channels: Part I—Carrier Sense Multiple-Access Modes and Their Throughput-Delay Characteristics," IEEE Trans. Comm., vol. 23, pp. 1400-1416, 1975, also incorporated by reference herein; see also D. S. Chan, T. Berger and L. Tong, "On the Stability and Optimal Decentralized Throughput of CSMA with Multipacket Reception Capability," Proc. of Allerton Conference on Comm., Control, and Computing, 2004, and D. S. Chan and T. Berger, "Performance and Cross-Layer Design of CSMA for Wireless Networks with Multipacket Reception Capability," Proc. of Asilomar Conference on Signals, Systems and Computers, 2004, both of which are also incorporated by reference herein). The control subsystem 640 implements the methods of this invention for transmitting information, as disclosed hereinabove, in a protocol for transmission enabling transmission with CD.

In one embodiment, the transmitter/receiver subsystem 630 includes a slotted-time transmitter sub-system. In that embodiment, the transmitter/receiver control subsystem 640 is capable of ascertaining a timing of transmission in relation to a timeslot. (Exemplary Slotted-time transmitter sub-systems can be, but are not limited to, similar to systems described in Tobagi, F. Analysis of a Two-Hop Centralized Packet Radio Network—Part I: Slotted ALOHA, IEEE Transactions on Communication, Volume 28, Issue 2, Date: February 1980, Pages: 208-216, incorporated by reference herein, and in Kobayashi, T.; Sugihara, A.; Enomoto, K.; Sasase, Slotted nonpersistent CSMA with an adaptive array and canceling signal, Global Telecommunications Conference, 1996. GLOBECOM '96. 'Communications: The Key to Global Prosperity, Volume 1, Date: 18-22 November 1996, Pages: 565-569 vol. 1, also incorporated by reference herein.)

In one instance, the physical layer 620 comprises wireless access to the communication channel 610 and the feedback channel 615. It should be noted that other instances of the physical layer 620, such as, but not limited to, wired systems are also within the scope of this invention.

Figure 13:
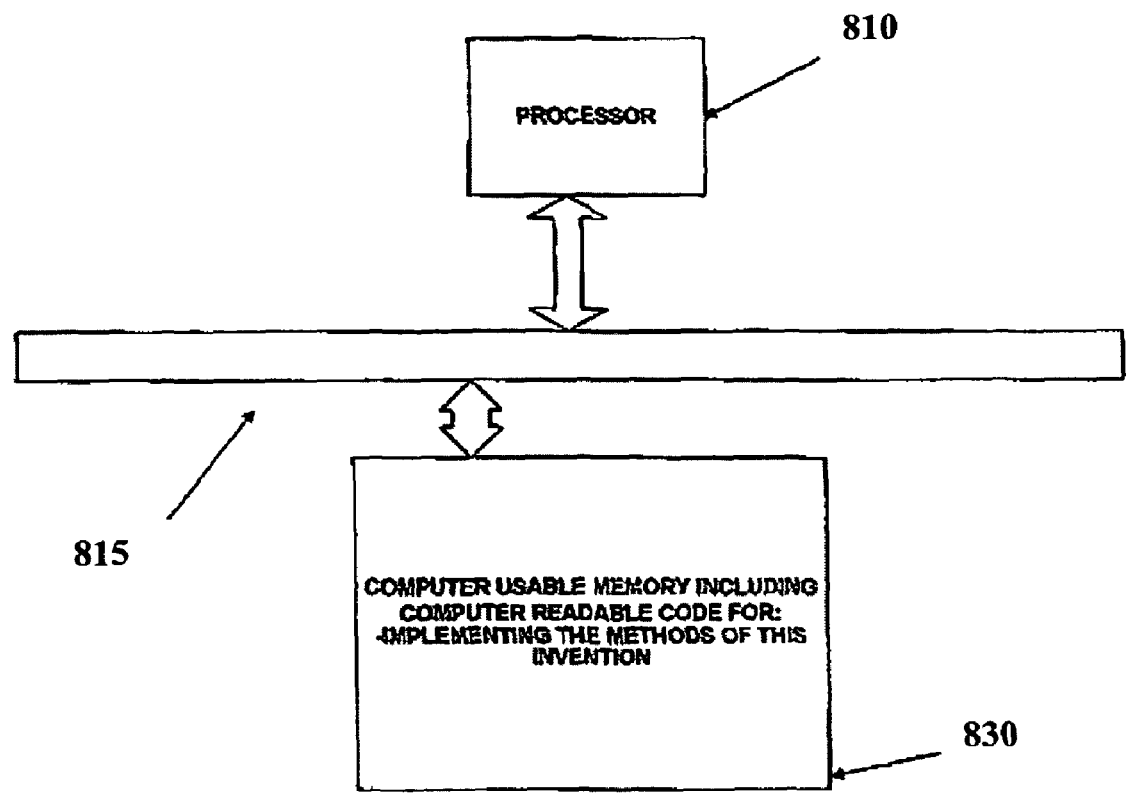
FIG. 13 represents a schematic block diagram representation of a component of the transmitting and/or receiving system of this invention.

In one embodiment, such as that shown in FIG. 13, the transmitter/receiver control subsystem 640 includes one or more processors 810, and computer usable media 830 having computer readable code embodied therein capable of causing one or more processors 810 to implement the methods of this invention. The one or more processors 810, the computer usable media 830, and the other components of FIG. 11 are operatively connected by means of a connection component 815 (the connection component may be, for example, a computer bus, or a carrier wave).

Figure 12:
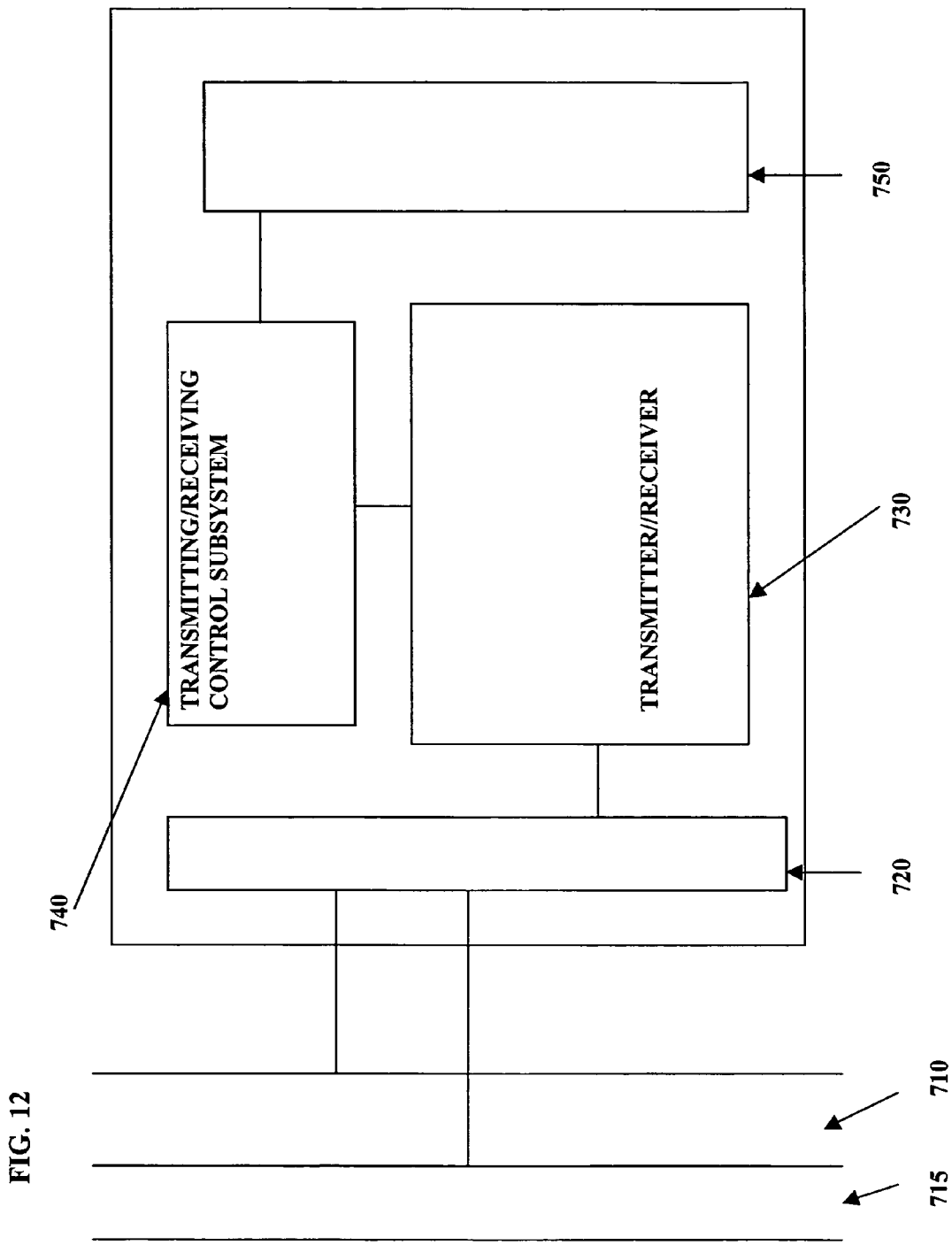
FIG. 12 is a schematic block diagram representation of an embodiment of the receiving system of this invention.

An embodiment of the receiving system of this invention is shown in FIG. 12. Referring to FIG. 7, the embodiment of the receiving system of this invention shown therein includes, a reception/transmission control subsystem 740 capable of determining whether transmissions over a communication channel are present, of initiating receipt of transmissions, of determining whether to stop any transmission, and of determining whether any transmissions has been completed, a receiving/transmitting subsystem 730 capable of receiving transmissions and of notifying, over a feedback channel, transmitting nodes of outcome determinations. The receiving/transmitting subsystem 730 is capable of receiving control information from the reception/transmission control subsystem 740 and of receiving determinations of transmissions completion and of transmission stoppage from the reception/transmission control subsystem 740. The receiving/transmitting subsystem 730 is capable of receiving transmissions from the communication channel 710 over a physical layer 720. A module 750 utilizes the received packets. The control subsystem 740 implements the methods of this invention for receiving information, as disclosed hereinabove, in a protocol enabling transmission with CD. The receiving/transmitting subsystem 730 can be, in one embodiment, but are not limited to being, similar to subsystems used in CSMA without MPR.

In one embodiment the transmitter and receiver systems of this invention are similar to conventional systems with CD (such as those described in A. C. V. Gummalla and J. O. Limb, "Design of an access mechanism for a high speed distributed wireless LAN," IEEE Journal on Selected Areas in Communications, vol. 18, Issue 9, pp. 1740-1750, September 2000 and in U.S. Pat. Nos. 6,804,251 and 4,063,220, the three of which are incorporated by reference herein) except that a CD signal is broadcasted on the feedback channel only for the duration which the participating transmitters would require to detect it.

In one embodiment, such as that shown in FIG. 13, the control subsystem 740 includes one or more processors 810, and computer usable media 830 having computer readable code embodied therein capable of causing one or more processors 810 to implement the methods of this invention. The one or more processors 810, the computer usable media 830, and the other components of FIG. 12 are operatively connected by means of a connection component 815 (the connection component may be, for example, a computer bus, or a carrier wave).

The techniques described above may be implemented in one or more computer programs executing on a programmable computer including a processor, a storage medium readable by the processor (including, for example, volatile and non-volatile memory and/or storage elements), and, in some embodiments, also including at least one input device, and/or at least one output device. Program code may be applied to data entered using the input device (or user interface) to perform the functions described and to generate output information. The output information may be applied to one or more output devices.

Elements and components described herein may be further divided into additional components or joined together to form fewer components for performing the same functions.

Each computer program (computer readable code) may be implemented in any programming language, such as assembly language, machine language, a high-level procedural programming language, an object-oriented programming language, or a combination thereof. The programming language may be a compiled or interpreted programming language.

Each computer program may be implemented in a computer program product tangibly embodied in a computer-readable storage device for execution by a computer processor. Method steps of the invention may be performed by a computer processor executing a program tangibly embodied on a computer-readable medium to perform functions of the invention by operating on input and generating output.

Common forms of computer-readable (computer usable) media include, for example, a floppy disk, a flexible disk, hard disk, magnetic tape, or any other magnetic medium, a CDROM, any other optical medium, punched cards, paper tape, any other physical medium with patterns of holes or other patterns, a RAM, a PROM, and EPROM, a FLASH-EPROM, any other memory chip or cartridge, a carrier wave, such as electromagnetic radiation or electrical signals, or any other medium from which a computer can read.

Although the invention has been described with respect to various embodiments, it should be realized this invention is also capable of a wide variety of further and other embodiments within the spirit and scope of the appended claims.

What is claimed is:

1. A method for transmitting information in a network, the method comprising the steps of:
   initiating transmission over a communication channel;
      multiple packets being transmitted simultaneously and successfully received over the communication channel;
   determining, by means of a control sub-system, whether signal energy of transmissions on said communication channel exceeds a predetermined amount;
   preventing transmission over said communication channel, if it has been determined, by the control sub-system, that said signal energy exceeds the predetermined amount;

monitoring a feedback channel; transmitted feedback information originates at a receiver, said receiver receiving and decoding simultaneously transmitted multiple packets; said transmitted feedback information conveying whether one or more of said simultaneously transmitted multiple packets can not be successfully decoded;

modifying transmission parameters for the transmission over the communication channel, if a feedback transmission is detected while monitoring the feedback channel, a duration of the feedback transmission being smaller than duration of the transmission over the communication channel; data being received over the communication channel;

determining communication channel information from the received data; the communication channel information comprising a status of transmissions on the communication channel; and determining, utilizing the communication channel information, whether to transmit.

2. The method of claim 1 wherein the step of modifying transmission parameters comprises the steps of:
determining if transmission should stop; and
rescheduling transmission, if transmission is stopped.

3. The method of claim 1 further comprising the step of:
rescheduling transmission, if transmission was not successful.

4. A method for receiving information over a communication channel, the method comprising the steps of:
monitoring the communication channel for transmission; multiple packets being transmitted simultaneously over the communication channel;
determining whether at least one transmission is present in the communication channel;
determining, by means of a control sub-system in a receiver, whether signal energy of transmissions over the communication channel exceeds a predetermined amount;
initiating receipt of the at least one transmission, if at least one transmission is present in the communication channel; multiple packets being successfully received from said at least one transmission;
a signal being transmitted, utilizing a feedback channel, the signal indicating that the communication channel is being utilized, if at least one transmission is present; the feedback signal comprising status information for the communication channel; whether at least some transmissions of multiple packets being transmitted simultaneously should be stopped being determined from said status information; the feedback signal conveying whether one or more of said simultaneously transmitted multiple packets can not be successfully decoded;
determining, if the at least one transmission is not stopped, whether transmission has been completed;
at least one transmitting node being notified of outcome of determination, a duration of a notifying transmission being smaller than duration of transmission over the communication channel.

5. The method of claim 4 wherein at least one transmitting node ceases transmission based on said feedback signal.

6. The method of claim 4 wherein in notifying transmitting nodes of outcome determinations the following step is performed:
notifying, if it is determined that at least one transmission has been completed, a node transmitting the at least one transmission of completion.

7. The method of claim 4 wherein in notifying transmitting nodes of outcome determinations the following step is performed:
notifying, if it is determined that the at least one transmission should be stopped, a node transmitting the at least one transmission to stop transmitting.

8. The method of claim 4 further comprising the step of: if all transmissions have not been stopped, providing communication channel conditions to transmitting nodes.

9. The method of claim 4 further comprising the step of:
if it is determined that all transmissions should be stopped, notifying all transmitting nodes to stop transmission.

10. The method of claim 1 wherein a slotted-time system is used for transmission; and wherein the step of scheduling transmission comprises the step of ascertaining a timing of transmission in relation to a timeslot.

11. The method of claim 1 further comprising the steps of:
receiving feedback channel information; and
determining, utilizing the feedback channel information, whether to transmit.

12. The method of claim 11 further comprising the step of:
scheduling, after determining not to transmit, attempted transmission after a backoff duration interval.

13. The method of claim 11 wherein a slotted-time system is used for transmission; and wherein the step of scheduling transmission comprises the step of ascertaining a timing of transmission in relation to a timeslot.

14. The method of claim 11 further comprising the step of:
determining transmission parameters, after determining to transmit.

15. The method of claim 1 wherein the step of determining whether to transmit comprises a step of determining whether a number of transmissions is at most equal to a predetermined number of transmissions.

16. A transmitter system comprising:
a transmitter/receiver subsystem comprising:
a transmitter/receiver portion capable of transmitting information over a communication channel and of receiving information transmitted over a feedback channel; said transmitter/receiver subsystem be capable of accessing the communication channel and the feedback channel through a physical layer; said transmitter/receiver subsystem capable of transmitting multiple packets simultaneously and successfully receiving multiple packets over the communication channel; and
a scheduling component capable of scheduling transmission of information over the communication channel; and
a transmitter/receiver control subsystem modifying transmission parameters for the transmission over the communication channel and of determining whether information was successfully transmitted; said transmitter/receiver control subsystem determining whether signal energy of transmissions on said communication channel exceeds a predetermined amount, said transmitter/receiver control subsystem preventing transmission over said communication channel, if it has been determined, by the control sub-system, that said signal energy exceeds the predetermined amount; the control subsystem determining whether to stop transmitting based on received feedback information; received feedback information originates at a receiver receiving and decoding said substantially simultaneously transmitted multiple packets; said received feedback information conveying whether at least one of said substantially simultaneously transmitted multiple packets, transmitted by said transmitter system, could not be successfully decoded.

17. The transmitter system of claim 16 wherein said transmitter/receiver control subsystem is also determining if transmission should stop and of rescheduling transmission, if transmission is stopped.

18. The transmitter system of claim 16 wherein said transmitter/receiver control subsystem also reschedules transmission, if transmission was not successful.

19. The transmitter system of claim 16 wherein a slotted-time system is used for transmission; and wherein said scheduling component also ascertains a timing of transmission in relation to a timeslot; a duration of feedback transmission over the feedback channel being at least one time slot.

20. The transmitter system of claim 16 wherein said transmitter/receiver control subsystem comprises:
at least one processor; and
at least one computer usable medium having computer readable code embodied therein, said computer readable code being capable of causing said at least one processor to:
modify transmission parameters for the transmission over the communication channel, if a feedback transmission is detected while monitoring the feedback channel;
determine whether transmission was successful, if transmission continues after modifying transmission parameters.

21. The transmitter system of claim 20 wherein said computer readable code, in causing said at least one processor to modify transmission parameters, is capable of causing said at least one processor to:
determine if transmission should stop; and
reschedule transmission, if transmission is stopped.

22. The transmitter system of claim 20 wherein said computer readable code is also capable of causing said at least one processor to:
reschedule transmission, if transmission was not successful.

23. The transmitter system of claim 20 wherein said computer readable code is also capable of causing said at least one processor to:
schedule, after determining not to transmit, attempted transmission after a backoff duration interval.

24. The transmitter system of claim 20 wherein said computer readable code is also capable of causing said at least one processor to:
determine transmission parameters, after determining to transmit.

25. The transmitter system of claim 16 wherein said scheduling component comprises:
at least one processor; and
at least one computer usable medium having computer readable code embodied there in, said computer readable code being capable of causing said at least one processor to:
receive feedback channel information;
determine, utilizing the feedback channel information, whether to transmit.

26. The transmitter system of claim 25 wherein said computer readable code is also capable of causing said at least one processor to:
schedule, after determining not to transmit, attempted transmission after a backoff duration interval.

27. The transmitter system of claim 25 wherein, in receiving feedback channel information, said computer readable code is capable of causing said at least one processor to obtain a number of transmissions present in the communications channel; and wherein, in determining whether to transmit, said computer readable code is capable of causing said at least one processor to determine whether the number of transmissions is at most equal to a predetermined number of transmissions.

28. The transmitter system of claim 16 wherein said scheduling component comprises:
at least one processor; and
at least one computer usable medium having computer readable code embodied therein, said computer readable code being capable of causing said at least one processor to:
receive data over the communication channel;
determine, from the received data, whether the communication channel is in use;
schedule transmission, after determining the communication channel not to be in use.

29. A receiver system comprising:
a reception/transmission control subsystem determining whether transmissions over a communication channel are present, initiating receipt of transmissions, determining whether to stop any transmission, determining whether signal energy of transmissions over the communication channel exceeds a predetermined amount, and determining whether any transmissions have been completed;
a receiving/transmitting subsystem receiving transmissions and notifying, over a feedback channel, transmitting nodes of outcome determinations; said receiving/transmitting subsystem being capable of receiving control information from said reception/transmission control subsystem and receiving determinations of transmission completion and of transmission stoppage from said reception/transmission control subsystem; said receiving/transmitting subsystem receiving transmissions from a communication channel; said receiving/transmitting subsystem separating and decoding multiple packets transmitted simultaneously over the communication channel; and
said receiving/transmitting subsystem also transmitting, if at least one transmission is present, a feedback signal over the feedback channel, the feedback signal comprising status information for the communication channel; the receiver receiving information according to a protocol enabling multiple packets being transmitted simultaneously (multipacket reception) (MPR); transmitted feedback signal conveying whether one or more of said simultaneously transmitted multiple packets can not be successfully decoded; said outcomes determination comprising whether one or more of said simultaneously transmitted multiple packets can not be successfully decoded.

30. The receiver system of claim 29 wherein said reception/transmission control subsystem comprises:
at least one processor; and
at least one computer usable medium having computer readable code embodied there in, said computer readable code being capable of causing said at least one processor to:
determine whether at least one transmission is present in the communication channel;
initiate receipt of the at least one transmission, if at least one transmission is present in the communication channel;

determine whether at least some transmissions of multiple packets being transmitted simultaneously should be stopped;

determine whether, if the at least one transmission is not stopped, whether transmission has been completed;

notify at least one transmitting node of outcome of determination, a duration of a notifying transmission being smaller than duration of transmission over the communication channel.

31. The method of claim 1 wherein the communication channel information comprises an estimate of a number of transmissions on the communication channel.

32. The method of claim 4 wherein the status information comprises a number of terminals transmitting.

33. The transmitter system of claim 20 wherein the communication channel information comprising a number of transmissions on the communication channel.

34. The receiver system of claim 29 wherein the status information comprises a number of terminals transmitting.

35. The method of claim 1 further comprising the step of determining whether transmission was successful, if transmission continues after modifying transmission parameters.

36. The method of claim 1 wherein, in the step of determining whether a signal energy of transmissions over said communication channel exceeds a predetermined amount, the step comprises determining whether an estimate of a total number of users transmitting simultaneously over the communication channel is less than a predetermined number.

37. The method of claim 4 wherein, in the step of determining whether a signal energy of transmissions over said communication channel exceeds a predetermined amount, the step comprises determining whether an estimate of a total number of users transmitting simultaneously over the communication channel is less than a predetermined number.

38. The transmitter system of claim 16 wherein said transmitter receiver control subsystem in determining whether a signal energy of transmissions over said communication channel exceeds a predetermined amount, determines whether an estimate of a total number of users transmitting simultaneously over the communication channel is less than a predetermined number.

39. The transmitter system of claim 29 wherein said reception/transmission control system in determining whether a signal energy of transmissions over said communication channel exceeds a predetermined mount, determines whether an estimate of a total number of users transmitting simultaneously over the communication channel is less than a predetermined number.

40. The method of claim 37 further comprising the step of broadcasting said estimate of the number of transmissions over the communication channel.

41. The method of claim 1 further comprising the step of delaying transmission for a backoff duration, if it has been determined, by the control sub-system, that said signal energy exceeds the predetermined amount, and allowing accessing said communication channel after said backoff duration.

42. The method of claim 41 wherein the step of scheduling transmission further comprises the step of: scheduling, after determining not to transmit, attempted transmission after a backoff duration interval.

43. The method of claim 4 wherein a duration of the feedback signal is smaller than duration of said at least one transmission over the communication channel.

44. The transmitter system of claim 16 wherein said transmitter/receiver control also delays transmission for a backoff duration, if it has been determined that said signal energy exceeds the predetermined amount; allowing accessing said communication channel after said backoff duration.

45. The transmitter system of claim 44 wherein said scheduling component comprises:
at least one processor; and
at least one computer usable medium having computer readable code embodied therein, said computer readable code being capable of causing said at least one processor to:
receive data over the communication channel;
determine communication channel information from the received data; the communication channel information comprising a status of transmissions on the communication channel;
determining, utilizing the communication channel information, whether to transmit.

46. The transmitter system of claim 16 wherein said transmission parameters comprise codes used for transmitting multiple packets simultaneously over the communication channel.

47. The transmitter system of claim 16 wherein a duration of feedback transmission over the feedback channel being smaller than duration of transmission over the communication channel.

48. The receiver system of claim 29 wherein a duration of notifying transmission over the feedback channel being smaller than duration of transmission over the communication channel.

* * * * *

UNITED STATES PATENT AND TRADEMARK OFFICE
CERTIFICATE OF CORRECTION

| | | |
|---|---|---|
| PATENT NO. | : 7,965,733 B2 | Page 1 of 1 |
| APPLICATION NO. | : 11/375853 | |
| DATED | : June 21, 2011 | |
| INVENTOR(S) | : Douglas S. Chan et al. | |

It is certified that error appears in the above-identified patent and that said Letters Patent is hereby corrected as shown below:

In column 14, line 65 (claim 16), "said substantially simultaneously transmitted" should read -- said simultaneously transmitted --

In column 14, line 67 through column 15, line 1 (claim 16), "said substantially simultaneously transmitted" should read -- said simultaneously transmitted --

In column 17, line 45 (claim 39), "predetermined mount" should read -- predetermined amount --

Signed and Sealed this
Thirtieth Day of August, 2011

David J. Kappos
*Director of the United States Patent and Trademark Office*